May 10, 1932.     N. M. JONES     1,857,912
ART OF ANCHORAGE AND PRODUCT THEREOF
Filed Oct. 28, 1929     2 Sheets-Sheet 1

Inventor
NOAH M. JONES,
By Edgar M Kitchin,
his Attorney

May 10, 1932.    N. M. JONES    1,857,912
ART OF ANCHORAGE AND PRODUCT THEREOF
Filed Oct. 28, 1929    2 Sheets-Sheet 2
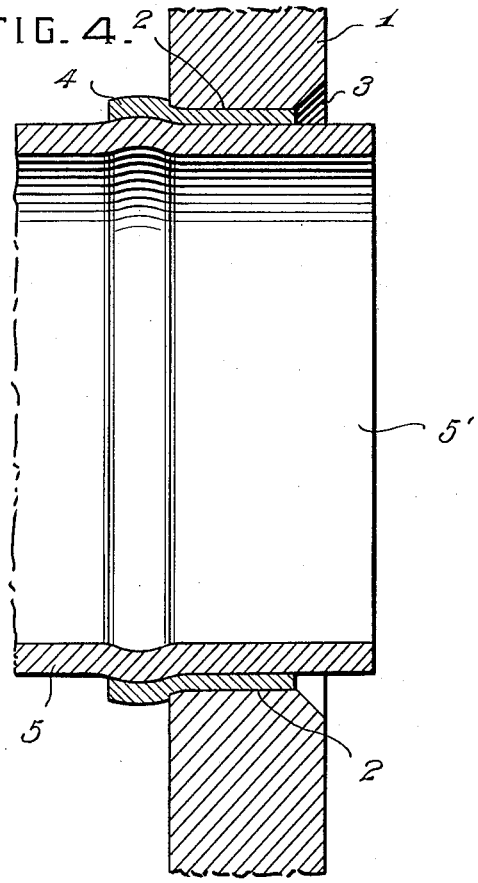
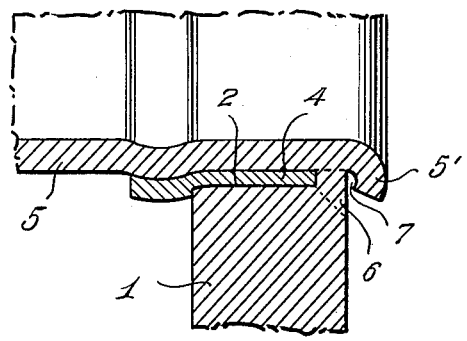
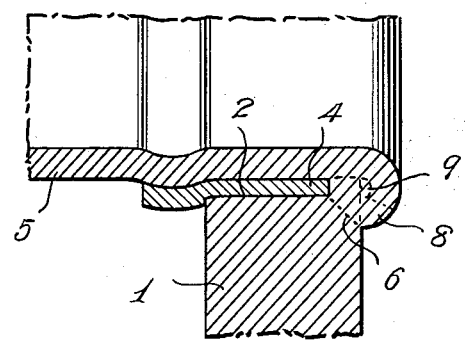
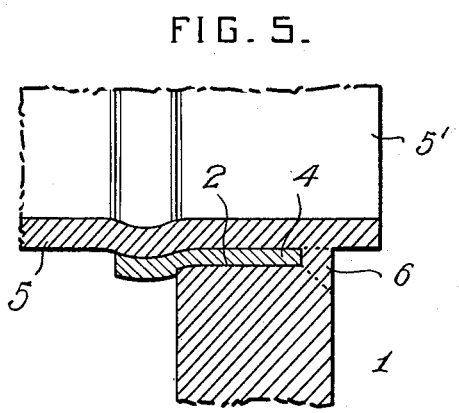
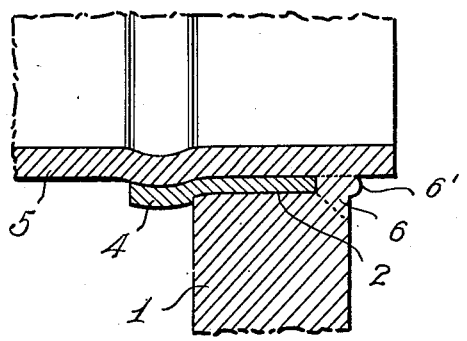
Inventor
NOAH M. JONES,
By Edgar M Kitchin,
his Attorney.

Patented May 10, 1932

1,857,912

UNITED STATES PATENT OFFICE

NOAH M. JONES, OF BALTIMORE, MARYLAND

ART OF ANCHORAGE AND PRODUCT THEREOF

Application filed October 28, 1929. Serial No. 403,025.

This invention relates to improvements in the art of anchorage of tubular parts to plates or sheets, and has as its essential object the effecting of a dependably stable non-leaking connection.

Briefly, it is common or standard practice to anchor the flues of locomotive boilers to the back flue sheet by preparing openings in the sheet slightly larger in diameter than the exterior diameter of the flues, inserting and rolling copper ferrules in said openings in position to project beyond the inner or water-contact face of the sheet and falling about one-sixteenth of an inch short of the exposed or outer face of the sheet; then inserting the flues through said ferrules and openings in the sheet to a short distance (usually about three-sixteenths of an inch) beyond the outer face of the sheet, expanding the inserted end portions of the flues within the sheet by the Prosser die swaging device, or other acceptable apparatus; and then flaring the exposed or projecting end portions of the flues and beading them down against the outer face of the sheet, and finally electrically welding the beads to the sheet.

In the carrying out of this standard practice, I have observed instances where the copper has been forced to a position out under the bead, and, therefore, a position where the copper interferes with the production of a permanently effective weld. The copper, of course, must be burned away, or otherwise eliminated, before a successful weld at any particular point can be accomplished, and, furthermore, the welding thus done anchors only the bead to the sheet and no effort is made to cause the weld to include any portion of the flue beyond the bead.

Among the various objects of the present invention is the improvement of this practice by the eliminating of possibility of interference from the presence of copper and the assuring of a perfect weld not only of the bead but also of a part of the tubular body itself, and, in greater detail, the present invention provides for the complete elimination of an air pocket between the bead and tubular body as sometimes occurs in products of the standard practice.

While for the sake of brevity, clarity, and facility of reference the specific structure of a back flue sheet of a locomotive and the flues connected thereto will be referred to, it should be understood that the present invention includes the anchorage of any tubular body to any plate where the invention is applicable.

In the carrying out of the invention, the steps employed and product secured are characterized by all of the advantages inhering in the standard practice with the further advantage of the initial safe-guarding against defective welding incident to the presence of copper and the assurance of anchorage of the tubular body to the sheet in addition to the anchorage of the bead thereto.

While the art comprising one of the phases of the instant invention does not depend upon any specific or detailed construction of apparatus or work being treated and is, obviously, susceptible of a wide range of variation and of comprehension without reference to detailed structure, the preferred steps and combinations of steps of the art and the resulting preferred product will both more readily become understood and apparent and be more easily discussed by reference to the accompanying drawings in which,—

Figure 4 is a view similar to Figure 3 with the tubular body shown as having been subjected to the step of expansion within the sheet, the parts being shown on an enlarged scale and parts being broken away proportionally.

Figure 5 is a view similar to Figure 4 with a fragment of the structure broken away for the saving of space, and the parts illustrated as in the condition after the next step of the present improved art.

Figure 6 is a view similar to Figure 5 with the parts illustrated in the condition after the next succeeding step.

Figure 7 is a view similar to Figure 6 with the parts shown in the condition after the final step of the present improved art.

Figure 8 is a view similar to Figure 5 of a device in the same stage of the art as seen in Figure 5, but in which an over-sized welding wire has been used.

Figure 1:
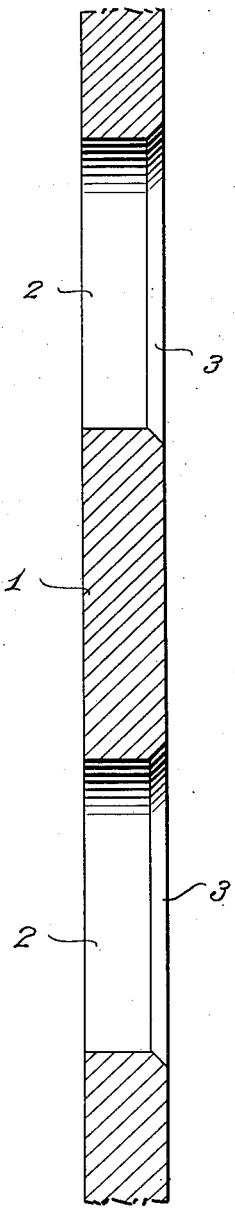
Figure 1 is a vertical section through a fragment of a sheet perforated to receive flues or like tubular bodies and provided with a specific, illustrative embodiment of the result of the first step of the present improved art.
Figure 2:
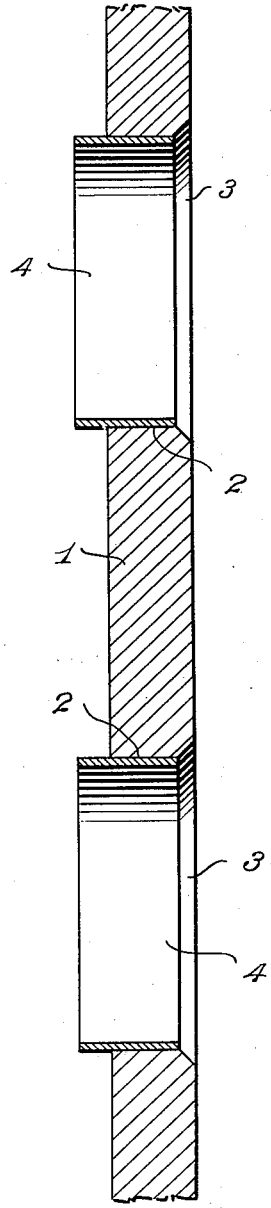
Figure 2 is a view similar to Figure 1 with the copper ferrules illustrated as finally located with respect to the sheet.

In the carrying out of the present improved art according to one specific series of preferred steps and combinations thereof, a sheet 1 is provided which, for illustrative purposes, may be considered the back flue sheet of the boiler of a locomotive, and the sheet is provided with the usual flue-receiving (tubular body receiving) apertures 2, 2. According to standard practice, the apertures 2 extend cylindrically through sheet 1, but, in the carrying out of the preferred steps of the present improved invention, the outer face portion of sheet 1 is beveled at 3, 3, about the openings 2, so that said openings flare outward. As seen in Figure 2, ferrules of copper or other appropriate variable expansion compensating material 4 are inserted in the openings 2, and are expanded therein by well known or appropriate rolling devices, so as to be held frictionally and firmly in place during the balance of the operation.

Figure 3:
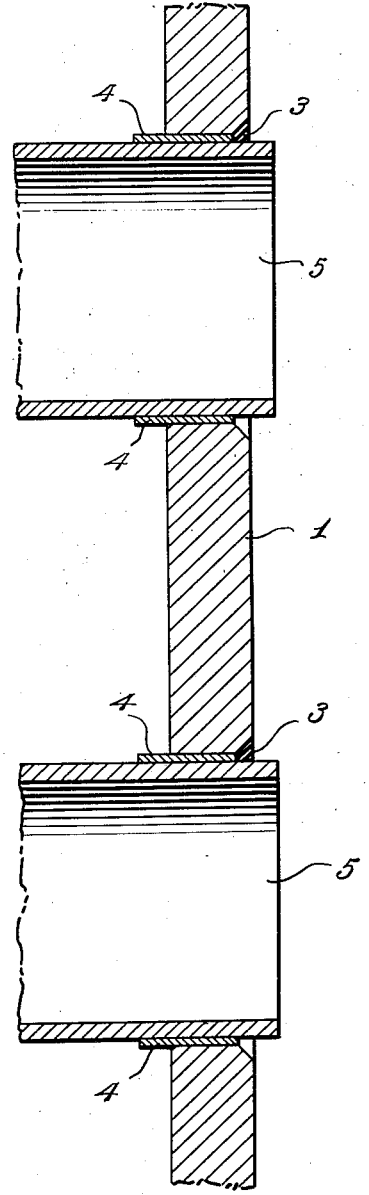
Figure 3 is a view similar to Figure 2 with the tubular bodies illustrated as in their initially introduced position.

The tubular bodies are then inserted through the openings 2 after the manner indicated in Figure 3, in which the flues 5, 5, are seen as having their end portions projecting through the ferrules 4 and for a short distance beyond the exposed or outer face of sheet 1. It will be noted that the countersinks 3 or chamfered portions provide an encircling space surrounding the tubular bodies 5 inward of the outer face of plate 1.

It will be understood, of course, that the plate 1 may be of any size and contour, and will have any number of openings 2 and corresponding parts according to the work in hand. Standard sizes of flues vary from two inches to three inches in diameter, and superheater flues vary from four and one-half to five and one-half inches, and the present invention is applicable not only to all of them but to any size and proportion of parts adapted for anchorage according to the invention. Also, it will be understood that the depth and inclination of the bevel 3 may vary to a substantial extent according to varying conditions and requirements. One preferred proportion comprehends a bevel 3 set on an angle of forty-five degrees and extending to a depth of one quarter of an inch inward from the outer face of the plate 1. This is given for purposes of illustration only and not as a limitation either in the degree of the angle or the depth to which the bevel may be extended. In fact, the present invention obviously comprehends any opening of whatever shape disposed to be located inward of the face of plate 1 and surrounding the respective tubular body and intended for the use now to be stated.

In Figure 4 is illustrated substantially the same structure as seen in Figure 3 except that the conventional step of Prosser die expanding has been carried out to expand the tubular body 5 into the opening 2 against the copper ferrule 4. The ferrule, of course, responds to variation in contour incident to the swaging action. The swaging action produces little or no variation of the relation of the parts so far as the annular space provided by the countersink 3 is concerned. If the ferrule 4 is slightly compressed, the extent of movement of the ferrule into the said space is negligible, and an annular opening, therefore, is left about the projecting end portion of the tubular body 5 inward of the outer face of plate 1.

In the carrying forward of the preferred steps of the present invention, the said annular space provided by countersink 3 is filled with welding material welded to the tubular body 5 and the plate 1 as seen at 6 in Figure 5. This may be accomplished by any well known mode of welding, as, for example, by the electric welding effected by insertion of a welding wire into the space provided by countersink 3 by charged pliers having electrical difference in potentiality from that of plate 1 sufficient to effect the welding action of the wire as it is inserted into the space provided by countersink 3. The welding action effected electrically by a welding wire is well known, and it should be understood that care will ordinarily be exercised to select the right gauge of welding wire to cause the weld 6 not only to effectively blend and acquire homogeneity with tubular body 5 and plate 1, but to just fill the annular space provided by countersink 3, so that the resulting structure seen in Figure 5 will be produced. In this figure, dotted lines are employed to indicate original structure, but it should be understood that such structure will have lost its identity incident to the welding action. While almost as of necessity the draftsman has illustrated an idealized condition, as seen in said Figure 5, the showing is substantially correct even including the smooth surface indicated at the outer face of that which had previously been the opening or space provided by countersink 3; but the present invention is in no sense limited to any such exactness of result, and it is entirely feasible to procure acceptable and even desirable results by the use of welding wire of a larger gauge than will fill the opening provided by countersink 3 after the manner seen in Figure 8 in which all the parts are identical with the showing in Figure 5 except that an irregularity 6' results which may assume the form of a ridge about the tubular body 5 which may later be utilized, as will hereinafter become apparent.

Whether the resulting structure be that seen in Figure 5 or in Figure 8, the next step of the preferred embodiment of the invention consists of the shaping of the projecting end portion of the tubular body 5. The said projecting end portion, as seen in Figures 3, 4, and 5, is indicated at 5' and may vary in length, but for standard flues three-sixteenths of an inch projection will usually be found ample. In Figure 6 the projecting end portion 5' is shown as having been first flared after the manner of standard practice, and then beaded over. The flaring operation, as is known to all those skilled in the art, is usually effected by the insertion of a substantially V-shaped instrument, which, being rotated while being pressed axially inward of the tubular body 5, causes the projecting portion 5' to flare to a condition where it may be subjected to the standard beading instrument which turns it down against the outer face of the sheet 1. In the standard practice, when this beading operation is accomplished, it is not infrequent that an air pocket, as seen at 7 in Figure 7, results, and if any part of the copper ferrule used in standard practice has been forced out into the air pocket the result will be a weld of the overturned bead at places spaced from the body of the flue or tube and thus liable to breakage and resulting leakage. By the present invention such possibility of danger is entirely obviated. It should be understood that Figure 6 is also a somewhat idealistic illustration of substantially what occurs when the flaring and beading operation is carried out, and that slight variations in the location of the flange produced by the projection 5' may and will result without any variation in the present invention. It should be observed also that dotted lines are employed in Figure 6 to indicate the former condition of parts varied by the welding action as described with respect to Figure 5. Obviously, also, if the over-sized welding wire were used, as indicated and described with respect to Figure 8, the beading over of the projection portion 5' would cause the resulting annular flange to rest on the irregular ridge 6' usually without leaving any air pocket unless for such as might be incident to irregularity of the ridge portion 6'.

When the parts have assumed the condition seen in Figure 6, the preferred, final step is taken to produce the result illustrated in Figure 7, and consists essentially of welding the flange formed from the projection portion 5' to contiguous portions of plate 1, including weld 6. This may be done electrically or otherwise as preferred, and the welding action will be such as to cause the welding metal to flow into the air pocket 7 (if there be an air pocket) and fill the same, and it is also desirable that any space between an edge portion of the flange of tubular body 5 and the sheet 1 should be filled after the manner indicated in Figure 7, so that the welding metal 8 and 9 will have been added to the structure seen in Figure 6, which produces a finished joint between the bead and the outer face of sheet 1. Dotted lines are employed in Figure 7 to indicate former conditions, but it will be understood that the welding material 8 and 9 will have attained a state of homogeneity both with the flange of tubular body 5 and with the former welding material 6 as well as with plate 1, so that a union of substantial proportions and of dependable stability will have been effectively accomplished.

The tubular body 5 is thus effectively welded to sheet 1 not only by and through the bead of the tubular body but also by direct welding of the tubular body itself to the sheet, and this is accomplished in a manner to eliminate the possibility of any air pockets, or like defective conditions tending to weaken the line of jointure between connected parts at the places of the weld.

While the annular space about the tubular body 5 is ilustrated and has been specifically described as having been produced by a countersink, it should be obvious that such space may be formed as a rabbet of any transverse or cross sectional contour.

What is claimed is:—

1. The art of anchoring a tubular body to a sheet comprising providing a space between material of the sheet and material of the tubular body outward of differential expansion compensating means located between the sheet and tubular body, and placing welding material in said space and effectively welding the said tubular body to said sheet across said space.

2. The art of anchoring a tubular body to a sheet comprising providing a space between material of the sheet and material of the tubular body outward of differential expansion compensating means located between the sheet and tubular body, and filling said space with welding material and effectively welding the said tubular body to said sheet across said filled space.

3. The art of anchoring a tubular body to a sheet comprising assembling a tubular body and sheet and a differential expansion compensating means with the tubular body extending through the sheet and the differential expansion compensating means located inward of the outer face of the sheet between the tubular body and the surrounding walls of the sheet, providing a space between the tubular body and sheet outward of the differential expansion compensating means, filling said space with welding material and effectively welding the tubular body and sheet across said filled space.

4. The art of anchoring a tubular body to a sheet comprising forming a sheet with an opening proportioned to receive the tubular body, forming a rabbet about the opening in the material of the sheet at the outer face thereof, locating a differential expansion compensating ferrule in the opening inward of the rabbet, inserting a tubular body through the ferrule to a position with the end portion of the tubular body extending beyond the sheet, and placing welding material in the rabbet and effectively welding the tubular body to the sheet across the rabbet.

5. The art of anchoring a tubular body to a sheet comprising forming a sheet with an opening proportioned to receive the tubular body, forming a rabbet about the opening in the material of the sheet at the outer face thereof, locating a differential expansion compensating ferrule in the opening inward of the rabbet, inserting a tubular body through the ferrule to a position with the end portion of the tubular body extending beyond the sheet, placing welding material in the rabbet and welding the tubular body to the sheet across the rabbet, and effecting a second weld between the tubular body and the sheet outward of the first weld.

6. The art of anchoring a tubular body to a sheet comprising inserting a tubular body through a sheet supplied with a differential expansion compensating means, welding the sheet and tubular body together outward of said differential expansion compensating means, beading the outer portion of the tubular body to overhang said weld, and welding the bead to the sheet.

7. The art of anchoring a tubular body to a sheet comprising inserting a tubular body through a sheet supplied with a differential expansion compensating means, welding the sheet and tubular body together outward of said differential expansion compensating means, beading the outer portion of the tubular body to overhang said weld, welding the bead to the sheet, and causing the welding material of the second weld to blend with the welding material of the first weld and to fill all the space between the bead and the sheet and first weld.

8. A structure comprising a sheet, a tubular body extending through the sheet and having a bead at its end portion overlying the sheet, a weld between the tubular body and sheet inward of the bead and outward of the inner face of the sheet, and a weld between the bead and sheet.

9. A structure comprising a sheet, a tubular body extending through the sheet, a differential expansion compensating ferrule surrounding the tubular body within the sheet, a weld between the sheet and tubular body outward of and blockading the ferrule, the tubular body having a bead outward of the sheet, and a weld connecting said bead to the sheet.

10. A structure comprising a sheet, a tubular body extending through the sheet, a differential expansion compensating ferrule surrounding the tubular body within the sheet, a weld between the sheet and tubular body outward of and blockading the ferrule, the tubular body having a bead outward of the sheet, and a weld connecting said bead to the sheet and to the first-mentioned weld.

11. A structure comprising a sheet, a tubular body extending through the sheet, a differential expansion compensating ferrule surrounding the tubular body within the sheet, a weld between the sheet and tubular body outward of and blockading the ferrule, the tubular body having a bead outward of the sheet, and a weld connecting said bead to the sheet and to the first-mentioned weld and occupying the entire space between the bead and the sheet and first-mentioned weld.

12. In the art of anchorage, providing a recess in a metal sheet opening to a tubular metal body, which body extends into the sheet, locating welding metal in the recess and welding the same to the sheet and tubular body, beading the tubular body beyond the weld, and welding the bead to the sheet.

13. In the art of anchorage, providing a recess in a metal sheet opening to a tubular metal body, which body extends into the sheet, locating welding metal in the recess and welding the same to the sheet and tubular body, beading the tubular body beyond the weld, filling all spaces between the bead, the first-mentioned weld, and the sheet with welding metal, and welding the bead, sheet and all the welding metal into a homogeneous mass.

14. The art of anchoring a tubular body to a sheet comprising providing a space between material of the sheet and material of the tubular body, locating differential expansion compensating means between the sheet and tubular body inward of said space, welding the tubular body effectively to the sheet across the space outward of the differential expansion compensating means and inward of the outer face of the sheet, and applying a second weld welding the outer end portion of the tubular body to the sheet outward of and across the first weld, all in a manner enabling the tubular body to be severed from the sheet by the formation of a space similar to the first-mentioned space and thus leaving the sheet conditioned to readily and effectively receive a substitute tubular body, whereby a new tubular body may be anchored to the sheet in substitution for the first tubular body substantially without injury to the sheet.

15. A structure comprising a sheet, a tubular body extending through the sheet and having a portion spaced from a portion of the sheet, differential expansion compensating means between the tubular body and a portion of the sheet at one side of said spacing, a weld connecting the tubular body across the spacing to the sheet outward of the differential expansion compensating means and inward of the outer face of the sheet, and a second weld connecting the tubular body to the sheet outward of and across the first weld in such relation to the tubular body and sheet that the tubular body may be severed from the sheet by the formation of a spacing similar to that first above mentioned and thus readily receive a substitute tubular body without injury to the sheet.

In testimony whereof I affix my signature.

NOAH M. JONES.